(12) United States Patent
Bourdev

(10) Patent No.: US 7,818,741 B1
(45) Date of Patent: Oct. 19, 2010

(54) METHOD AND SYSTEM TO MONITOR INSTALLATION OF A SOFTWARE PROGRAM

(75) Inventor: Lubomir D. Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1555 days.

(21) Appl. No.: 11/131,166

(22) Filed: May 17, 2005

(51) Int. Cl.
 *G06F 9/45* (2006.01)
(52) U.S. Cl. .................................................. 717/174
(58) Field of Classification Search ............... 717/174, 717/149
 See application file for complete search history.

(56) References Cited

U.S. PATENT DOCUMENTS

| | | | | |
|---|---|---|---|---|
| 5,509,070 A * | 4/1996 | Schull | | 705/54 |
| 5,815,484 A * | 9/1998 | Smith et al. | | 369/275.1 |
| 5,953,532 A * | 9/1999 | Lochbaum | | 717/176 |
| 6,009,401 A * | 12/1999 | Horstmann | | 705/1 |
| 6,009,525 A * | 12/1999 | Horstmann | | 726/22 |
| 6,027,622 A * | 2/2000 | Graser et al. | | 204/426 |
| 6,243,468 B1 * | 6/2001 | Pearce et al. | | 380/255 |
| 6,243,692 B1 * | 6/2001 | Floyd et al. | | 705/59 |
| 6,334,214 B1 * | 12/2001 | Horstmann | | 717/170 |
| 6,854,061 B2 * | 2/2005 | Cooper et al. | | 713/190 |
| 2002/0083318 A1 * | 6/2002 | Larose | | 713/164 |
| 2002/0197528 A1 * | 12/2002 | Zunke | | 429/144 |
| 2003/0088515 A1 * | 5/2003 | Cooper et al. | | 705/50 |
| 2004/0025033 A1 * | 2/2004 | Todd | | 713/189 |
| 2005/0038752 A1 * | 2/2005 | Gaetano et al. | | 705/59 |
| 2006/0106728 A1 * | 5/2006 | Yellai et al. | | 705/59 |

* cited by examiner

*Primary Examiner*—John Chavis
(74) *Attorney, Agent, or Firm*—Schwegman Lundberg & Woessner, P.A.

(57) ABSTRACT

A method and a system is provided of monitoring installation of a software program on at least one user computer. The software program may be subject to a license agreement that specifies a number of permitted installations of the software program. The method may comprising receiving an installation identifier identifying a useable installation of the software program on the at least one user computer and determining if the installation identifier is one of a set of installation identifiers. The set of installation identifiers may comprise at least one monitored installation identifier and the set may be created or generated when a number of user installations exceeds a limit of installations (e.g., a number of permitted useable installations). When the received installation identifier is one of the set, the method may comprise modifying the set so that the received installation identifier is no longer a monitored installation identifier.

21 Claims, 12 Drawing Sheets

LICENSE AUTHORIZES 3 USEABLE INSTALLATIONS

INITIAL SET UP AFTER INSTALLATION OF TWO CLIENT APPLICATIONS AND PRIOR TO ANY HANDSHAKE

- SEAT 1 : SEAT ID = A + INTEGER VALUE - SEAT ID = A1
- SEAT 2 : SEAT ID = B + INTEGER VALUE - SEAT ID = B1
- SEAT 3 : NOT USED

FIG. 10

AFTER HANDSHAKE BY SEAT 1

- SEAT 1 : SEAT ID = A2
- SEAT 2 : SEAT ID = B1
- SEAT 3 : NOT USED

FIG. 11

AFTER HANDSHAKE BY SEAT 2

- SEAT 1 : SEAT ID = A2
- SEAT 2 : SEAT ID = B2
- SEAT 3 : NOT USED

FIG. 12

AFTER INSTALLATION OF SEAT 3

- SEAT 1 : SEAT ID = A2
- SEAT 2 : SEAT ID = B2
- SEAT 3 : SEAT ID = C1

FIG. 13

AFTER INSTALLATION OF SEAT 4
(NUMBER OF INSTALLED SEATS EXCEEDS NUMBER OF SEATS AUTHORIZED IN LICENSE)

- SEAT 1 : SEAT ID = A2
- SEAT 2 : SEAT ID = B2
- SEAT 3 : SEAT ID = C1
- SEAT 4 : SEAT ID = D1

ACTIVATE PROBATION OBJECT : $(A2, B2, C1)_3$

FIG. 14

AFTER HANDSHAKE OF SEAT SEAT 3
(NUMBER OF INSTALLED SEATS EXCEEDS NUMBER OF SEATS AUTHORIZED IN LICENSE)

- SEAT 1 : SEAT ID = A2
- SEAT 2 : SEAT ID = B2
- SEAT 3 : SEAT ID = C2
- SEAT 4 : SEAT ID = D1

MODIFIED PROBATION OBJECT : $(A2, B2)_2$

FIG. 15

AFTER HANDSHAKE OF SEAT SEAT 3
(NUMBER OF INSTALLED SEATS EXCEEDS NUMBER OF SEATS AUTHORIZED IN LICENSE)

- SEAT 1 : SEAT ID = A2
- SEAT 2 : SEAT ID = B2
- SEAT 3 : SEAT ID = C3
- SEAT 4 : SEAT ID = D1

PROBATION OBJECT REMAINS : $(A2, B2)_2$

FIG. 16

AFTER HANDSHAKE OF SEAT SEAT 4
(NUMBER OF INSTALLED SEATS EXCEEDS NUMBER OF SEATS AUTHORIZED IN LICENSE)

- SEAT 1 : SEAT ID = A2
- SEAT 2 : SEAT ID = B2
- SEAT 3 : SEAT ID = C3
- SEAT 4 : SEAT ID = D2

PROBATION OBJECT REMAINS : $(A2, B2)_2$

FIG. 17

AFTER HANDSHAKE OF SEAT SEAT 2
(NUMBER OF INSTALLED SEATS EXCEEDS NUMBER OF SEATS AUTHORIZED IN LICENSE)

- SEAT 1 : SEAT ID = A2
- SEAT 2 : SEAT ID = B3
- SEAT 3 : SEAT ID = C3
- SEAT 4 : SEAT ID = D2

MODIFIED PROBATION OBJECT : $(A2)_1$

FIG. 18

METHOD AND SYSTEM TO MONITOR INSTALLATION OF A SOFTWARE PROGRAM

TECHNICAL FIELD

The present application relates generally to the technical field of monitoring installation of software programs on at least one user computer. For example, a software program may be subject to a license agreement and the method and system may monitor installation and use of the software program to check compliance with the license agreement.

BACKGROUND

Software programs are typically subject to a license agreement which regulates the use of the software program. For example, the license agreement may be a shrink-wrap agreement allowing only a single installation of the software program. In a business environment, for example, a license for a particular software program may authorize the business to have multiple installations or instances of the software on different computers. In these circumstances, the license may specify a maximum number of permitted installations or seats of the software program at any given time.

In order to avoid unauthorized use of a software program that may be installed on multiple computers, certain technologies use some form of a hardware footprint which is established upon installation of the software program. When the number of installations exceeds a permitted number of installations authorized by the license agreement, an alarm or notification may be triggered indicating a breach of the agreement. In some circumstances the installation software may prevent further installations. However, one or more of the subsequent installations may replace a previous installation and the further installation may thus be a permitted installation. In these circumstances, a user may be required to contact a customer service facility to authorize a further installation (and activation) of the installed software program. Thus, in these circumstances, a system purely counting a number of reinstalls may render a newly installed software program inoperable even though the user may not have exceed the number of installations specified in a license agreement.

SUMMARY

According to one example embodiment, there is provided a system and a method of monitoring installation of a software program on at least one user computer. The method may comprise receiving an installation identifier identifying a useable installation of the software program on the at least one user computer and determining if the installation identifier is one of a set of installation identifiers. The set of installation identifiers may comprise at least one monitored installation identifier and may be created or provided when a number of user installations exceeds a limit of useable installations (e.g., a number of permitted number of installations). When the installation identifier is one of the set, the method may comprise modifying the set so that the installation identifier is no longer a monitored installation identifier.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, and in which like references indicate the same or similar elements.

In the drawings,

FIGS. 10 to 18 show example seat identifiers, a set of monitored seat identifiers, and the updating and monitoring thereof.

DETAILED DESCRIPTION

A method and system to monitor installation and use of one or more software programs on one or more user computers or devices are described. In the following description, for purposes of explanation, numerous specific details are set forth in order to provide a thorough understanding of embodiments of the present invention. It will be evident, however, to one skilled in the art that the present invention may be practiced without these specific details.

Figure 1:
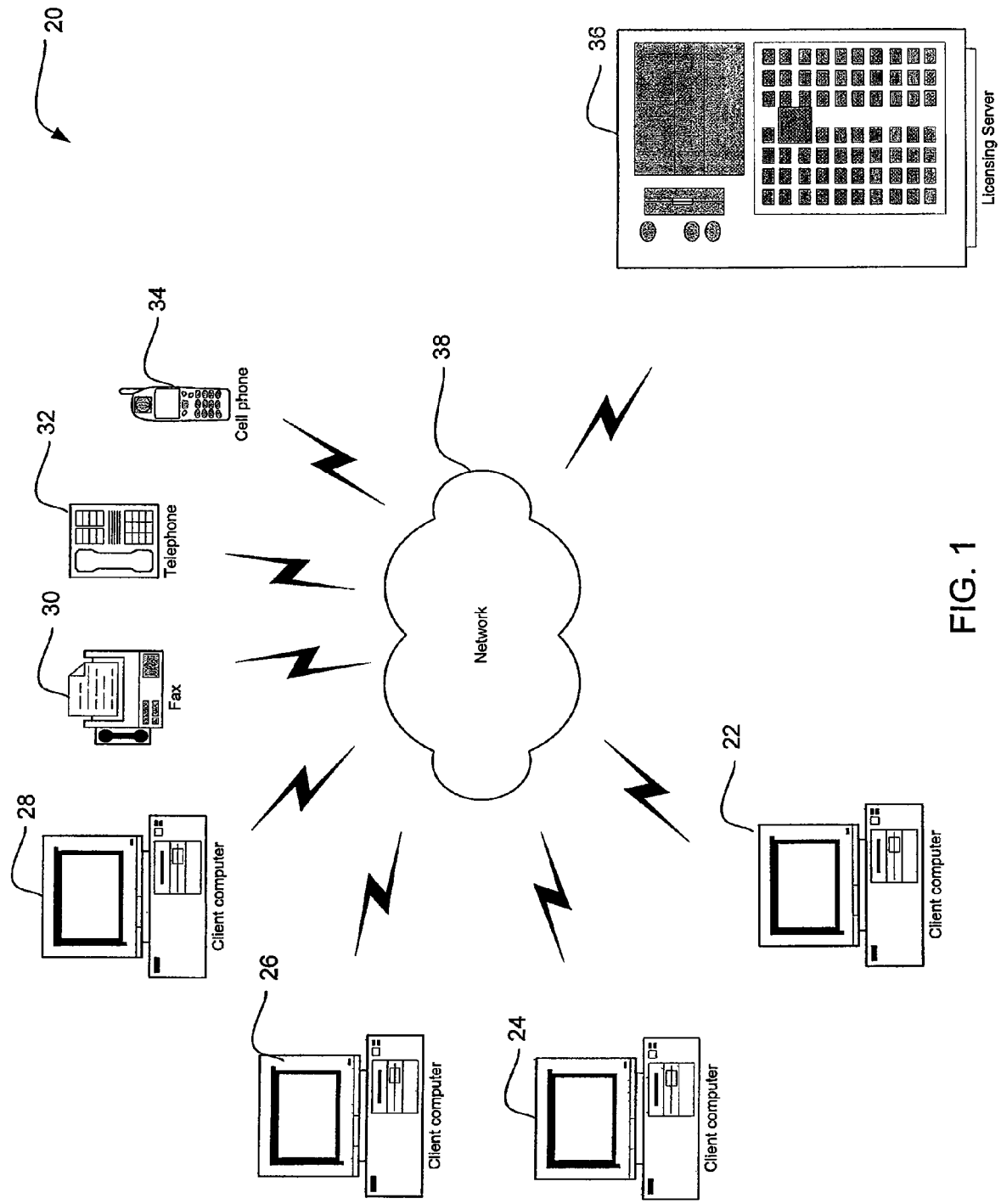
FIG. 1 shows a system, in accordance with an example embodiment, to monitor installations of one or more software programs on one or more user computers.

Referring in particular to FIG. 1, reference 20 generally indicates a system, in accordance with an example embodiment, to monitor installation of a computer or software program on one or more user computers. For the purposes of this specification, the term "computer" is intended to include any device capable of executing software irrespective of the complexity of the software application or the device. Examples of such user computers include personal computers 22-28, one or more fax machines 30, one or more programmable telephones 32, one or more mobile or cell phones 34, or the like. As mentioned herein, the system 20 may include any electronic device capable of being programmed including, but not limited to, tablet PCs, set top boxes, personal digital assistants (PDA), or any other machine capable of executing a set of instructions.

The system 20 also includes a server 38 in the exemplary form of a licensing server, which is connected to the user computers 22-34 via one or more networks 38 which may be wired or wireless. As described in more detail below, software programs installed on one or more of the user computers 22-34 periodically communicate installation or seat identifiers to the licensing server 36 which monitors the number of useable installations or seats (which terms are used herein interchangeably) of the software program on a user computer connectable to the network 38. It should, however, be appreciated that the user computers 22-34 need not be continuously connected to the network 38 and that the network 38 may, in one example embodiment, comprise a telephone network.

Figure 2:
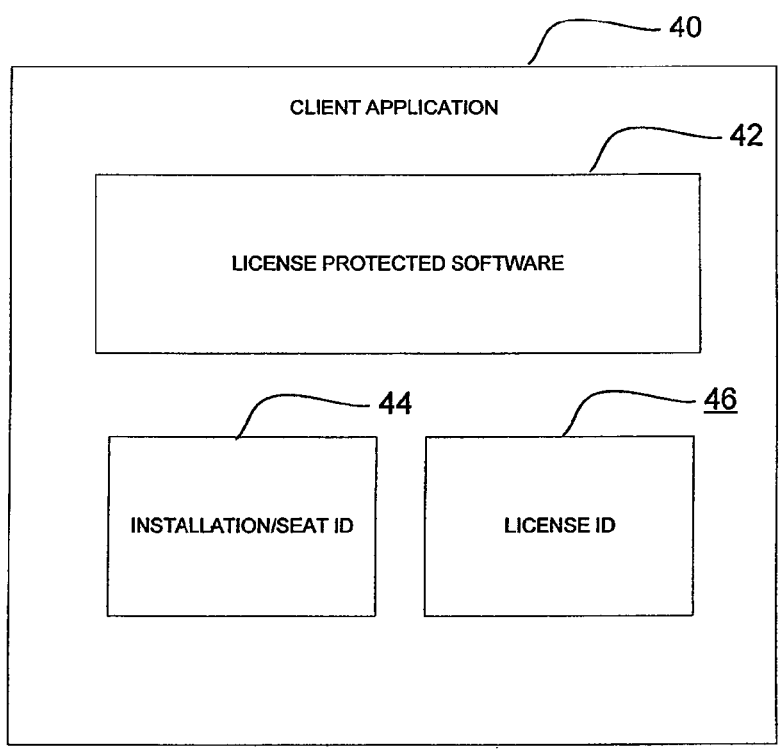
FIG. 2 shows a client application, in accordance with an example embodiment, installed on a user computer.

As shown in FIG. 2, each user computer 22-34 may include a client application 40 which has been installed (e.g. from an installation executable) on the user computer. The client application 40 may include license protected software 42, an installation or seat identifier 44, and a license identifier 46. The license identifier 46 may identify a license agreement under which one or more installations or seats have been authorized and wherein each seat may be identified by a unique seat identifier. Accordingly, the installation or seat identifier 44 may be unique to the particular installation of the client application 40 on a specific user computer 22-34.

The licensing server 36 may include a server application 50 running on the licensing server 36. From a functional viewpoint, the server application 50 may include a communication module 52, an installation initialization module 54, an installation identifier monitor 56, and a database interface module 58. The communication module 52 allows the server 36 to communicate with the client applications 40; the installation initialization module 54 allows the server 36 to initialize the license protected software program 42 of the client application 40; the installation identifier monitor allows the server 36 to monitor installations of the software program on the user computers 22-34; and the database interface module 58 allows the licensing server 36 to access reference data relating to the various installations of the software program. It is to be appreciated that the example modules/components shown in the client application 40 and the server application 50 are for illustrative purposes only and are used to show exemplary functionality of the system 20. They do not necessarily correspond to independent hardware or software units.

In one example embodiment, an installable copy of the software program may be distributed to a user by providing (e.g., via mail, in a retail store, or the like) a physical copy (e.g. a DVD or CD installation disk) which a user/licensee may then utilize to install one or more instances of the software program 42 on one or more user computers depending upon, for example, the terms of a license agreement. In addition or instead, an installable copy of the software program 42 may be communicated electronically via a computer network 38 to the user. In this example scenario, the user or licensee may then download the installation copy of the software program 42 and install the software on one or more user computers depending upon terms of the license agreement.

Figure 4:
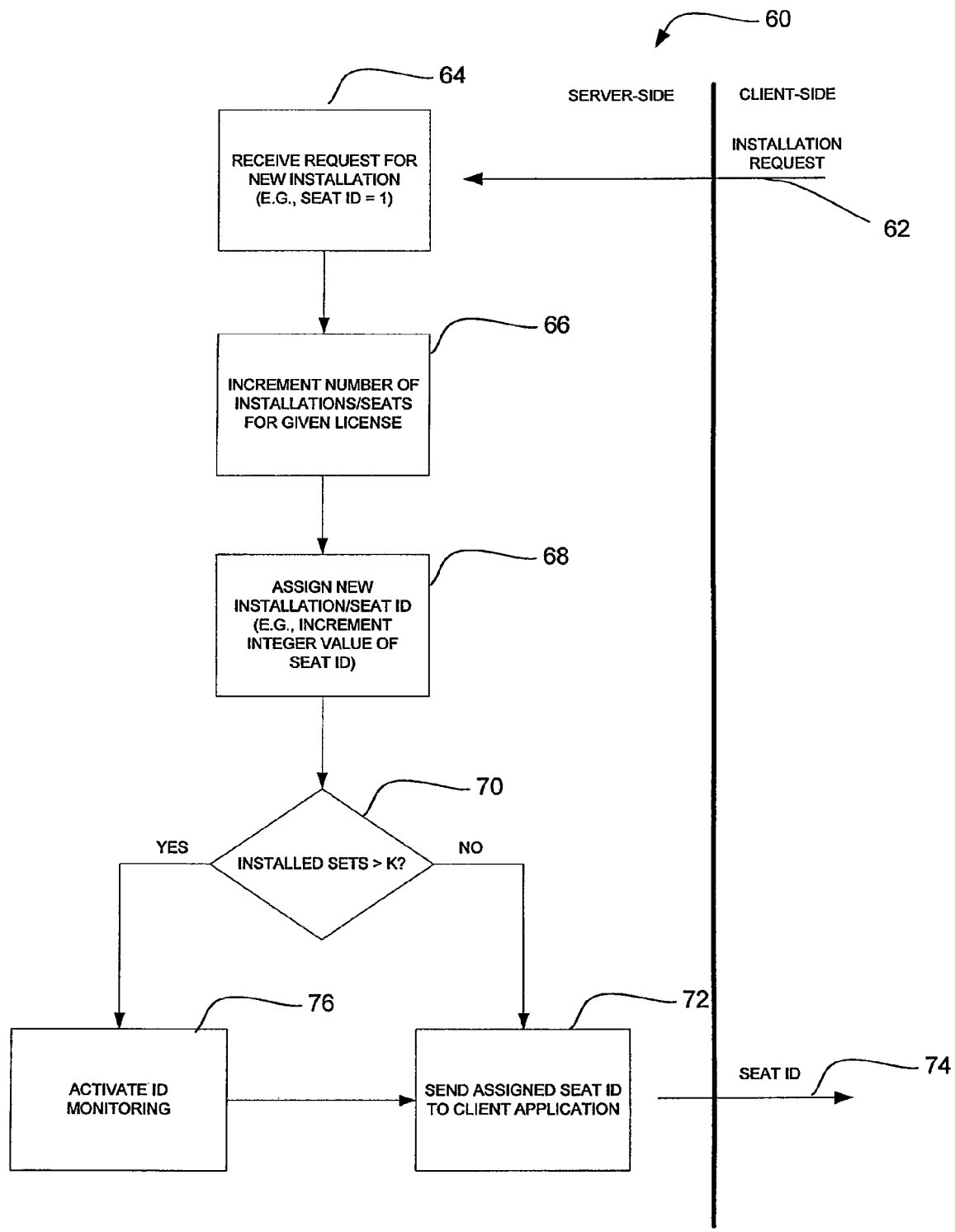
FIG. 4 shows a method, in accordance with an example embodiment, of initializing an installation of a software program on a user computer.

FIG. 4 shows a method, according to an example embodiment, of initializing an installation of a software program on a user computer. During installation of the software program on one of a user computer 22-34, the installation program may generate an installation request 62 which is communicated from an installation site to a licensing facility. In one example embodiment, the installation request is communicated via the network 38 to the licensing server 36 after an installation executable has executed on a user computer 22-34. It is, however, to be appreciated that the installation request 62 may be communicated verbally by a person installing the software using a telephone system. In one example embodiment, the installation request 62 includes the license identifier 46 and an initial installation identifier 44 which may identify a new installation of the software program. In an embodiment, unlike other licensing schemes, the "installation request" may be the first handshake. As such, it need not necessarily have to happen immediately upon installation. In an embodiment, the first handshake may happen minutes, or weeks after installation. Thus no interne connection may be required to install the software program. As shown at block 64, in an embodiment, the installation request 62 is received at the licensing server 36 whereafter, as shown at block 66, a number of installations or seats for a given license identified by the license identifier (ID) 46 is then incremented. In an example embodiment, the seat identifier 44 may be associated with a license identifier 46 provided at the licensing server 36. In an embodiment, the seat identifier 44 and the license identifier 46 can be merged into a single number from which they can be uniquely derived at the licensing server.

An initial installation or seat identifier 44 may be a recognizable identifier so that the licensing server 36 can recognize or identify the installation request 62 as a request for a new installation of the software program. Accordingly, as shown at block 68, a new installation identifier may be assigned to the particular installation of the software program on the user computer 22-34. Thereafter, as shown at decision 70, a determination may be made whether or not a number of installed seats exceeds (or id equal to) a number of permitted or authorized installations or seats (or any system defined limit). The limit or number of permitted installations may be provided in the license agreement. If the number of installed seats does not exceed the number of permitted seats, the newly assigned seat identifier may be communicated to the user computer 22-34 (see block 72 and arrow 74). However, if the number of installed seats exceeds the permitted or allowed number of seats in terms of the license agreement, identification monitoring may be activated (see block 76) and the newly assigned seat identifier may then be communicated to the user computer 22-34. In an example embodiment, the identification monitor is an object.

It will be appreciated that a new installation of the software program does not necessarily constitute a violation of the license agreement. For example, the software program may be reinstalled on the same user computer following technical difficulties. For example, a defective hard drive on the user computer may be replaced resulting in the loss of the original installation of the software program. Alternatively, the software program may be uninstalled by the user on a particular user computer 22-34 and installed on another user computer resulting in an installation request 62 being sent from the other user computer. In both these circumstances a violation of the software license may not have taken place. Although the given example relates to a single installation, it will be appreciated that, in terms of the license agreement, multiple installations of the software program may be authorized and, during the existence of the license, one or more installations may be lost (e.g. replacement of a defective hard drive) or uninstalled and reinstalled on other user computers.

In one example embodiment, the client application 40, upon receipt of the updated seat identifier (see arrow 74) from the licensing server 36, updates its installation or seat identifier 44 (see FIG. 2). Thereafter, when the client application 40 subsequently communicates with the server application 50, it includes the updated installation or seat identifier 44 in its communication or report that then uniquely identifies the installation of the client application 40.

Figure 5:
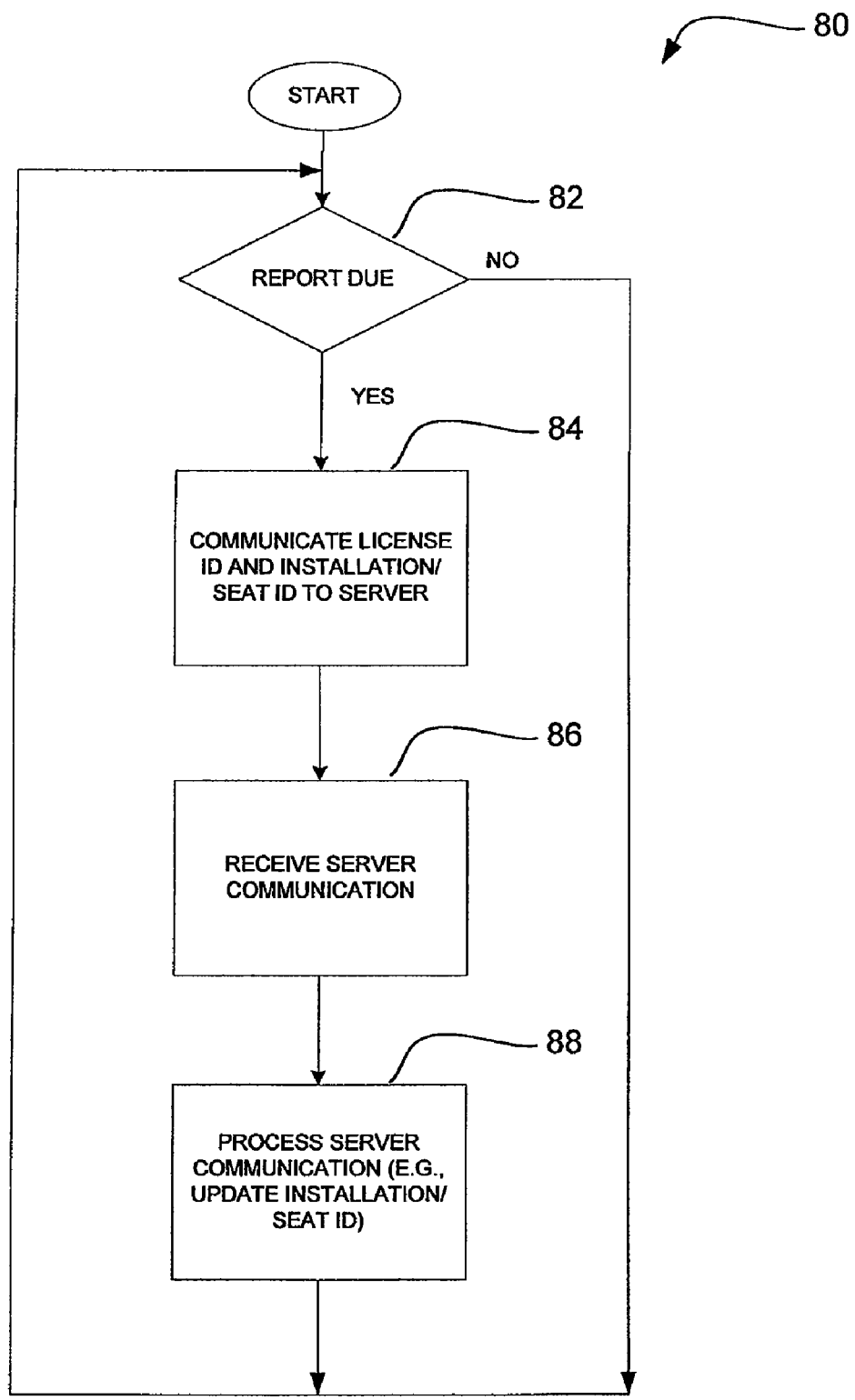
FIG. 5 shows a method, in accordance with an example embodiment, that executes on a user computer for communicating a unique installation or seat identifier to a server application.

Referring to FIG. 5, reference 80 generally indicates a method, in accordance with an example embodiment, that executes on a user computer (e.g., a user computer 22-34) for communicating a unique installation or seat identifier to the licensing server 36. As shown at decision 82, the client application 40, as an ongoing process, determines when a report or communication to the licensing server 36 is due. The report may thus periodically communicate the license identifier 46 and the seat identifier 44 to the licensing server 36 via the network 38. It will be appreciated that the frequency or regularity of such a report may vary from one embodiment to another. For example, when the network 38 is the Internet and the client computers 22-34 are regularly online, the client application 40 may communicate its seat identifier 44 and its license identifier 46 each time the client application 40 is open for use. It will, however, be appreciated that the client application 40 need not be opened for use by a user to communicate its installation identifier 44 and license identifier 46 to the licensing server 36 but may also do so independently of actual use or operation of the client application 40. For example, each time a user computer 22-34 connects to the Internet, the seat identifier 44 and the license identifier 46 may be communicated to the licensing server 36. In an example embodiment, when the user computer 22-34 irregularly establishes communications with the licensing server 36, reports may be queued and all queued reports may be communicated when possible.

Returning to decision 82 in FIG. 5, if no reports by the client application 40 are due, the method 30 does not communicate the seat identifier 44 or the license identifier 46 to the licensing server 36 but merely waits until an appropriate time duration or period has lapsed. If, however, a report by the client application 40 is due, the client application 40 communicates its seat identifier 44 and license identifier 46 to the licensing server 36 (see block 84) or may queue reports. Thereafter, as described in more detail below, the licensing server 36 may update the seat identifier 44 and, accordingly, the method 80 may then receive a communication from the licensing server 36 that includes an updated seat identifier 44 (see block 86). The client application 40 may then process the communication from the licensing server 36 by updating its seat identifier 44 so that it corresponds to the updated seat identifier stored at the licensing server 36 (see block 88).

Figure 6:
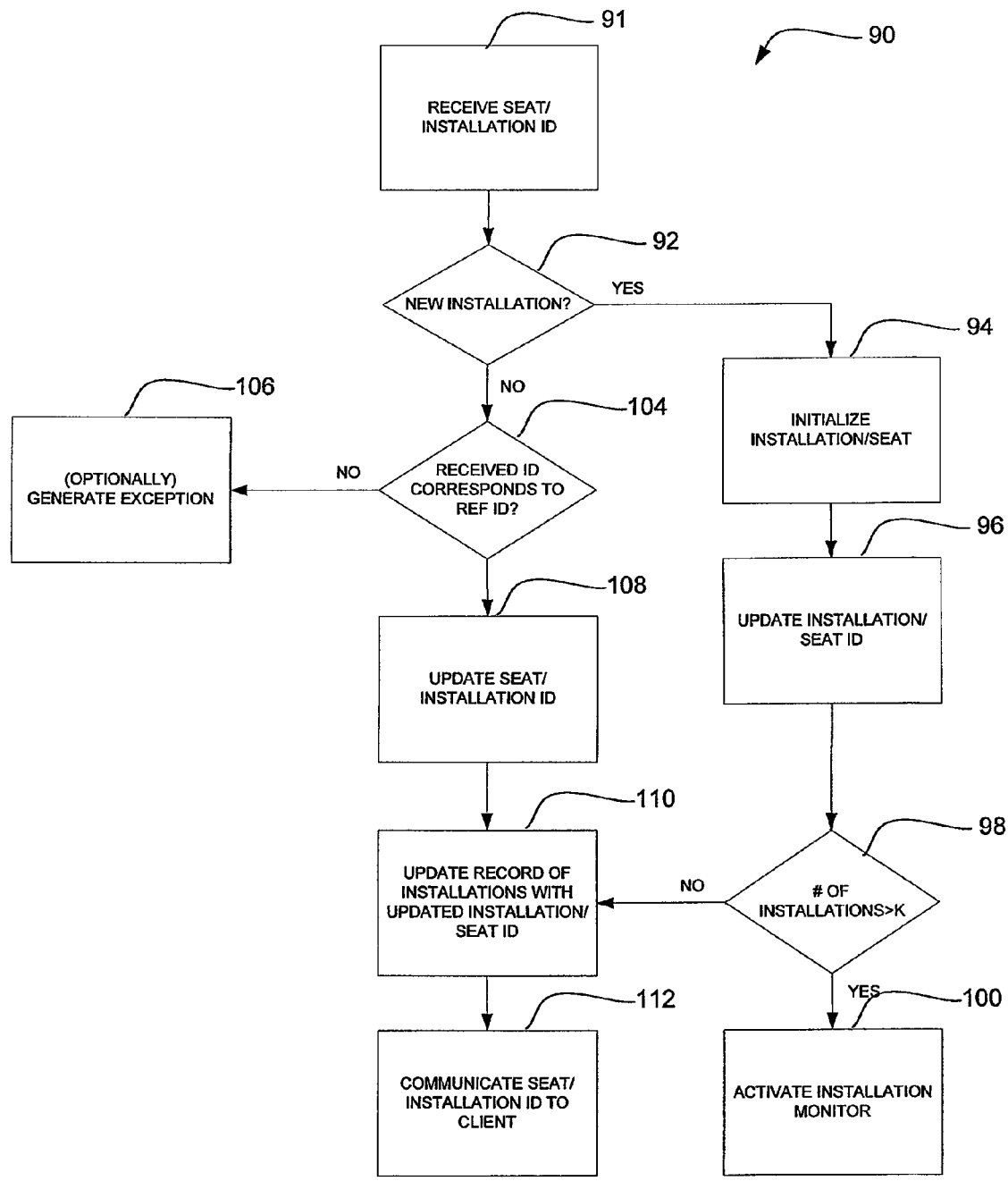
FIG. 6 shows a method, in accordance with an example embodiment, of monitoring the installation of one or more software programs on a user computer.

In FIG. 6 reference 90 generally indicates a method, in accordance with an embodiment of the invention, for monitoring installation of one or more software programs on at least one user computer. For example, the method 90 may be used to monitor the installation of the application program 40 on any one or more of the user computers 22-34. As shown at block 91, the method 90 may receive the seat identifier 44 from a particular user computer 22-34 that is communicating, for example, with the licensing server 36. As shown at decision 92, it may then be determined whether or not the request received from the user computer 22-34 is a request for a new installation or whether the request or communication is a periodic report by an already existing installation of the client application 40. As shown at blocks 94 and 96, the method 90 may initialize the installation on the user computer 22-34 so that it may be operable or useable and communicate an updated seat identifier 44 to the client application 40 (see FIG. 4). Thereafter, as shown at decision 98, if the number of installations exceeds the number of permitted installations installation monitoring may be performed as shown at block 100. For example a probation object, as described in more detail below, may be created.

Returning to decision 92, if the communication does not include a request for a new installation, but is a report by the client application 40 including its seat identifier 44 and license identifier 46, the method 90 then determines whether or not the received seat identifier 44 corresponds to a reference seat identifier (see decision 104). If the received seat identifier does not correspond to the reference seat identifier at the licensing server 36, an exception may be generated as shown at block 106. It will be appreciated that various different courses of action may result in response to the exception. For example, a warning may be communicated to the user computer 22-34 to indicate that the seat identifier 44 does not correspond with that at the licensing server 36 and request the user to contact a customer support facility, provide the user with an option to purchase more licenses, or any other appropriate action. In addition or instead, an appropriate message may be generated at the licensing server facility. As each seat identifier 44 is updated after the client application 40 has reported to the licensing server 36, an old or different seat identifier 44 could indicate to the licensing server 36 that a duplicate copy of the software program now exists. For example, a first installation of the software program may have received a unique seat identifier 44 from the licensing server 36 and, accordingly, the licensing server 36 would have a record of this particular unique seat identifier 44 being associated with the particular installation of the software program. If a user duplicates the installation on another user computer 22-34, and the duplicate version of the software program communicates the old seat identifier 44 to the licensing server 36, the licensing server 36 may then identify that a duplicate copy of the software program exits. In an embodiment, each seat has a unique seat identifier 44, and each handshake provides a new unique seat identifier 44 to each seat. A copy of the current unique identifiers 44 of each seat may kept at the server licensing server 36. Suppose, for example, the current seat identifier 44 is C3 (and the licensing server 36 knows that) and someone makes a binary copy of the hard drive and runs it on another computer. Both installations will have C3 as their unique seat identifier 44. The first one of them to handshake with the licensing server 36 will be permitted to operate, but both it and the licensing server 36 will update the seat identifier 44 to, for example, C4. If the other seat ever handshakes with the licensing server 36 and provides its (now obsolete seat identifier 44) C3, the licensing server 36 identify that a duplication my exist.

Returning to decision 104, if the received seat identifier 44 corresponds to the reference seat identifier, the licensing server 36 may then confirm that it is communicating with the same client application 40 that it previously communicated with and updated its seat identifier 44. The method 90 may then update the seat identifier once again (see block 108) and also update its record of reference seat identifiers as shown at block 110. Thereafter, the updated seat identifier may be communicated to the client application 40 (see block 112). The client application 40, may then update its seat identifier 44 to correspond with the current or latest seat identifier provided at the licensing server 36. It will be noted that if the number of installations does not exceed the permitted number of installations at decision 98, the method 90 also proceeds to block 112.

Figure 7:
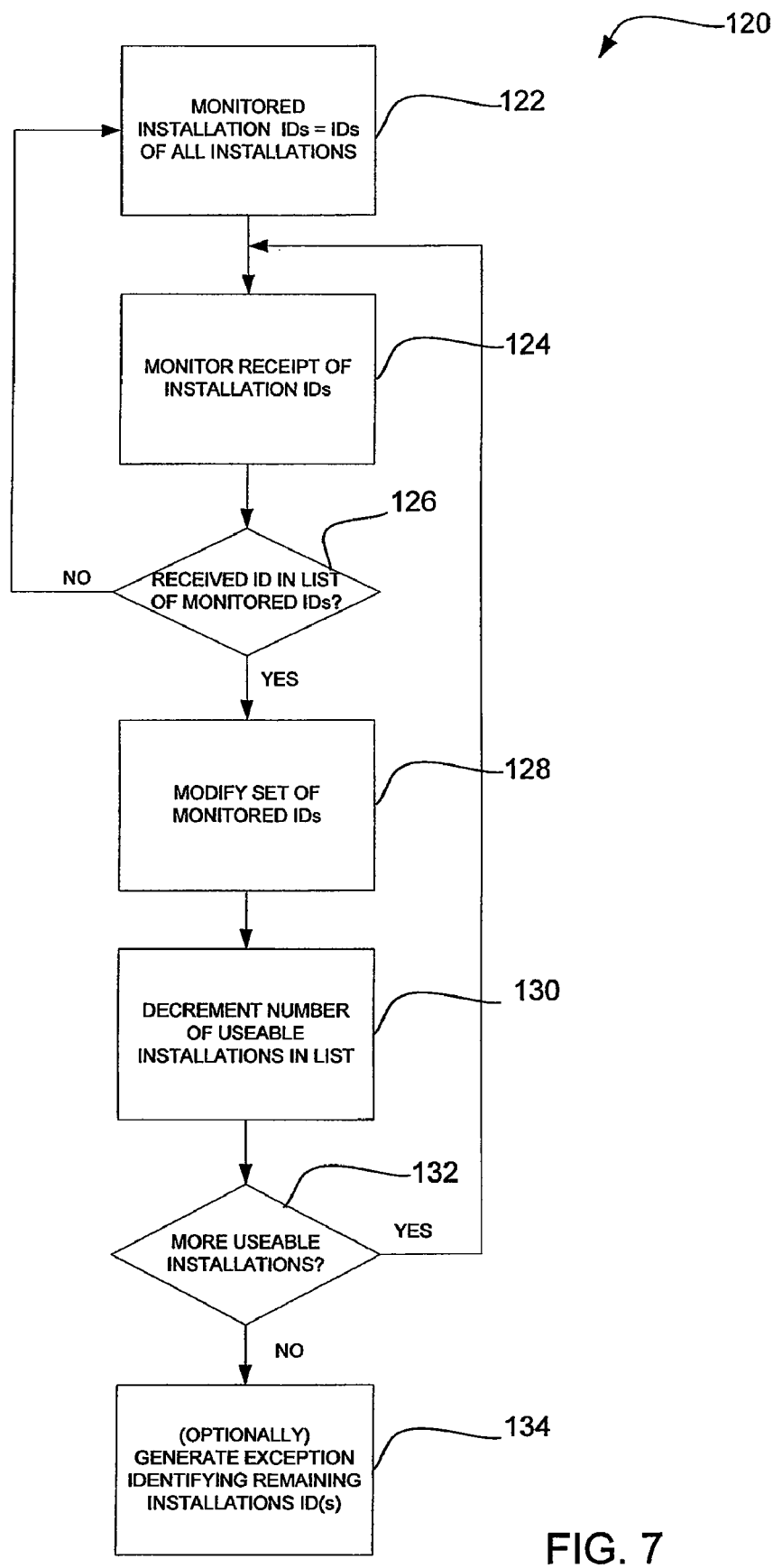
FIG. 7 shows a method, in accordance with an example embodiment, of monitoring installation or seat identifiers uniquely associated with each installation of the software program.

Referring to FIG. 7, reference 120 generally indicates a method, in accordance with an example embodiment of the invention, to monitor seat identifiers received from a plurality of user computers (e.g. the user computers 22-34). The method 120 may monitor multiple installations of a software program in accordance with a license agreement identified by a license identifier (e.g. the license identifier 46). Each installation may be uniquely identified by a seat identifier (e.g. the seat identifier 44). As shown at block 122, the method 120 may define a set or list of monitored installation identifiers wherein each installation identifier in the set or object is monitored by the method 120. In one example embodiment, the method 120 may be in the form of a probation object that is created when the server 36 detects that the number of installed instances of the software program exceeds the number of installations permitted in terms of the license agreement. Initially, as shown at block 122, the set of monitored installation identifiers may include the installation identifiers of all known installations at a given point in time. Thereafter, the method 120 may monitor a seat installation or seat identifiers 44 received from one or more of the user computers 22-34 (see block 124). Thereafter, as shown at decision 126, the method 120 may identify when a received seat identifier 44 is in the set or list of monitored seat identifiers. If the seat identifier 44 received from a particular client application 40 is not a monitored seat identifier, then the method 120 may return to block 122 and await receipt of a further seat identifier 44 from a client application 40 installed on one of the user computers 22-34. In these circumstances, when the received seat identifier is not a monitored seat identifier (not in the set of monitored seat identifiers) this may mean that the installation is an authorized installation and that the number of installed instances of the software program 42 do not exceed the permitted number of installations provided in the license agreement.

If, however, the received seat identifier 44 is included in a set of monitored seat identifiers, the set of monitored seat identifiers may be modified (e.g., updated or marked) so that the method 120 no longer monitors the specific seat identifier and thus its associated installation (see block 128). The method 120 may then mark or categorize the particular installation one of the permitted installations of the software program 42. As the method 120 may define or mark the installation as permitted or authorized it is no longer necessary to monitor the specific installation but continues to monitor other installations to see if they are permitted installations. Accordingly, as shown at block 130, the method 120 may decrement a number of useable installations remaining in terms of the license agreement. For example, the method 120 after removing the permitted installation from the set, may identify the number of remaining useable installations available in terms of the license agreement.

As shown at decision 132, if no more useable installations or seats are available in terms of the license agreement, then an exception may be generated as shown at block 134. The exception may identify or send a message to the client application 40 and/or a license control facility to indicate that the number of installations of the software program associated with the license identifier 46 has been exceeded. It will be appreciated that any other appropriate action may be taken, for example, one or more of the installations of the software program 42 may be disabled. If, however, more useable installations are available, the method 120 continues to monitor the receipt of further installation or seat identifiers 44 from the user computers 22-34.

Figure 8:
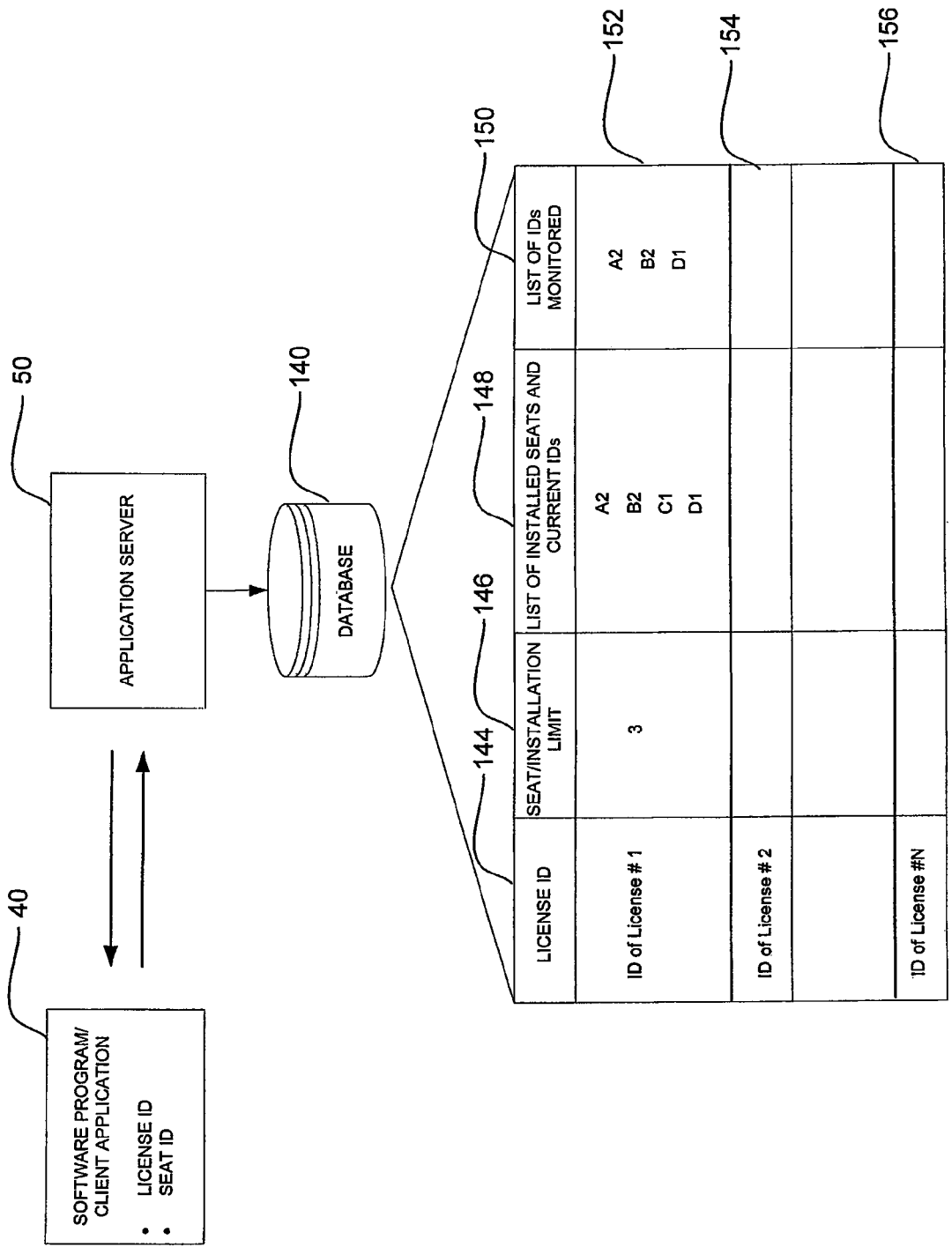
FIG. 8 shows a schematic diagram of a database storing data for monitoring a number of useable installations or instances of a software program.

Referring to FIG. 8, shows a schematic diagram of a database 140 for storing data for monitoring a number of useable installations of a software program. The database 140 is shown by way of example to include records 142. The database 140 may be accessed by the application server 50. In one example embodiment, the records 142 are arranged in tables including a license identification column 144, a seat or installation limit column 146, a list of installed seats and their current seat identifiers column 148, and a list of monitored installation identifiers column 150. It will be appreciated that dependent upon the specific implementation of the invention, data need not be arranged in tables but may be in the form of objects or any other data configuration. In the present example tables are used to facilitate the description of the seat identifiers 44. The records 142 include a row 152 that identifies data associated with a license number "1", a second row 154 associated with a license identification number "2", and so on until a $N^{th}$ row 156 associated with a license number "N". In one example embodiment, the records 142 relate to a specific software application or program 42 that has been distributed. Thus, each row 152, 154, 156 may correspond to a license agreement under which the software application or program has been licensed. Accordingly, when the licensing server 36 monitors the installation of a plurality of different software programs 42, each software program 42 may have data stored in the database 140 that corresponds to each license under which the software program 42 is licensed.

Figure 9:
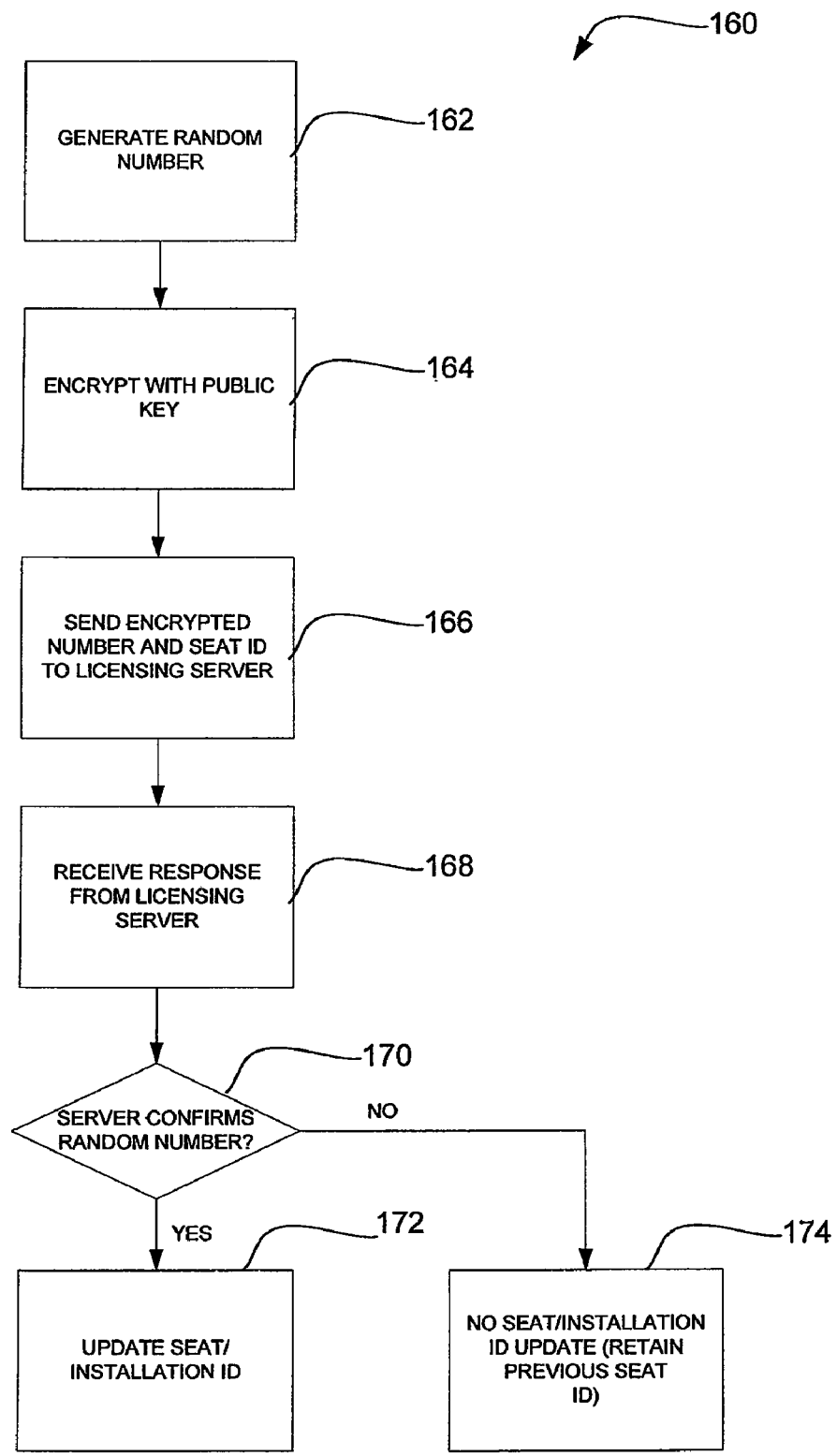
FIG. 9 shows a method, in accordance with an example embodiment, of ensuring that a user computer is communicating with an authorized licensing server prior to communication of its seat identifier.

In one example embodiment, prior to communicating with the application server 36, the client application 40 first establishes or determines whether or not it is communicating with an authorized server application 50. Reference 160 in FIG. 9 generally indicates a method, in accordance with an example embodiment, of ensuring that a user computer is communicating with an authorized server in addition to (or prior to) communication of its seat identifier to the server. The method 160 may be performed on each user computer 22-34 prior to communicating its seat identification 44 to the server application 50. As shown at block 162, the client application 40 first generates a random number and, thereafter, encrypts the number with a public key (see block 164), for example, of a real licensing server. In an RSA encryption deployment scenario, a pair of public and private keys may be used. The encrypted number together with its installation or seat identifier 44 and, optionally, its license identifier 46 is communicated to a potentially authorized server application 50 as shown at block 166. If the communication is received by an authorized server application 50, the server application 50 then decrypts the encrypted random number using its private key and returns the decrypted number it derives after decryption to the client application 40 (see block 168). Thereafter, as shown at decision 170, the client application 40 confirms whether or not the random number it generated equals (or corresponds with) the decrypted number and, if so, the client application 40 communicates its installation or seat identifier 44 and its license identifier 46 to the server (see block 172). If, however, the decrypted number received from the server does not correspond with the random number generated by the client application 40, the client application 40 refrains from sending its seat identifier 44 and its license identifier 46 to the server as shown at block 174. Thus, in an example embodiment, the encryption and decryption of a random number using a public/private key combination may be used to ensure that the client application 40 does not communicate with a bogus licensing server.

In order to facilitate explanation of the functionality performed by the method and system, an example scenario of processing seat identifiers is described below. In particular, FIG. 10 shows example seat identifiers after an initial installation and initialization of two client programs 42, and prior to any subsequent handshakes or communications by the client applications 40 to the licensing server 36. The exemplary scenario in FIGS. 10 to 18 assumes a seat or installation limit of three useable seats (see column 146 in FIG. 8). It will however be appreciated that the seat or installation limit, which may correspond to the number of permitted or allowed installations in terms of a license agreement, may vary from deployment to deployment. In one example embodiment, each seat identifier 44 includes a copy identification portion which identifies the actual copy of the installation executable (e.g., installation CD or down load) used to install the software program 42, and a numerical portion which, in the illustrated example, is an integer. In the illustrated example, the copy identification portion may be a letter of the alphabet. Accordingly, a first seat identifier (seat 1) may be identified by "A1", a second seat identifier (seat 2) may be "B1", and so on. As shown in FIG. 10, seat 3, which in the present example has not been installed, has no seat identifier. Assume that the user computer 22-34 on which an installation with an seat identifier "A1" handshakes with (or communicates a report) to the licensing server 36, the licensing server 36 would, as described above, modify or update the seat identifier 44. In one example embodiment, the modification is accomplished by incrementing the numerical portion of the seat identifier 44. Accordingly, after a first handshake by the user computer 22-34 on which an installation corresponding to seat identifier "A1" has been received by the licensing server 36, the received seat identifier ("A1") is updated to "A2" (see FIG. 11). As no communication or report has been received from the installation corresponding to seat identifier B1, its reference or current seat identifier remains "B1".

Assuming that the user computer 22-34 on which a software installation with the seat identifier "B1" reports to the licensing server 36, the licensing server 36 then increments the numerical portion of the seat identifier resulting in an updated and current seat identifier "B2" (see FIG. 12). Thus, as the user computers 22-34 communicate with the licensing server 36 and its server application 50, the seat identifiers are updated and a copy of the updated seat identifier is stored at the licensing server 36 and also communicated to the client application 40 so that it can also update its version of the seat identifier 44.

FIG. 13 shows an example where a new seat or installation has been installed which has a corresponding installation or seat identifier "C1". It will be appreciated that, at this stage, the maximum number of permitted installations that are allowed in the license agreement of the present example has been reached (see column 146 in FIG. 8). Thus, should a further installation be initialized, the possibility then exists that the license agreement has been violated. For example, FIG. 14 shows an example where a fourth seat having a seat identifier "D1" has been initialized. At this point in time, a license violation may or may not have occurred. For example, a user may have uninstalled the installation corresponding to seat identifier "A2" and/or seat identifier "B2" and/or seat identifier "C1". It will be appreciated that if anyone of the seats 1-3 have been uninstalled or are no longer useable, a license violation may not have occurred. In addition to, or instead of, uninstalling a particular seat, a defective hard drive on which the software program was installed may be removed and replaced with a new hard drive and installation of seat four may then have taken place on the new hard drive. In these circumstances again, only three useable seats exist and thus no violation of the example license agreement may have taken place. However, the possibility also exists that there now are four installations of the software program 42, one of which is in violation of the license agreement.

Figure 3:
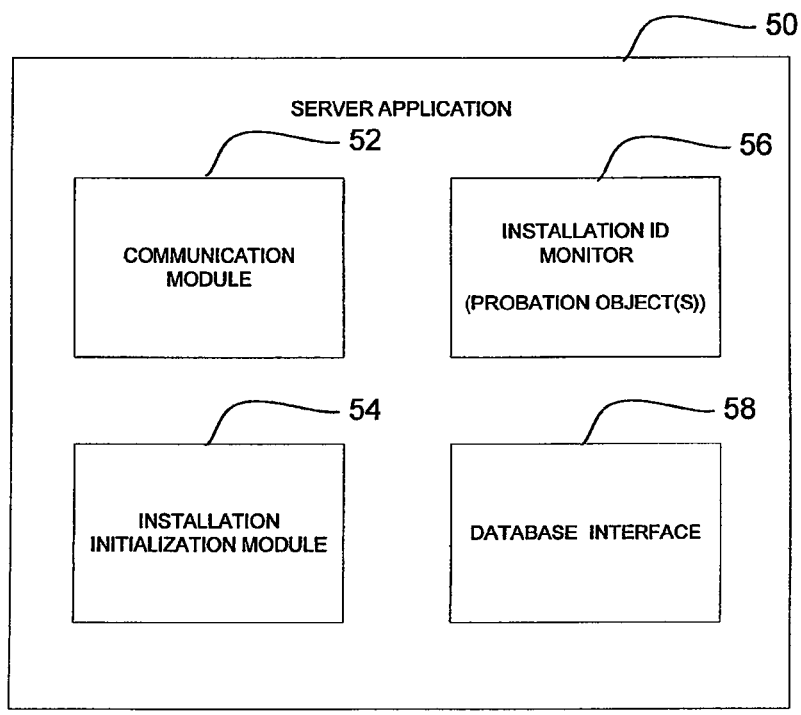
FIG. 3 shows a server application, in accordance with an example embodiment, for monitoring installations of one or more software programs on one or more user computers.

After the new installation of seat 4, the server application 50 can be sure that at least seat 4 with seat identifier "D1" is useable or active. The actual status of seats one to three may not be known with certainty. Thus, installation monitoring is activated (see FIG. 3 and block 100 in FIG. 6). In one example embodiment, the installation monitoring is performed by a probation object and, in the present example, the probation object may include identifiers associated with seats 1 to 3. For example, a probation object including the set of seat identifiers "A2", "B2", "C1" may be generated. Of the set of monitored seat identifiers, only two may be useable installations as the license agreement in the present example permits three useable installations of the software program 42 and the server application 50 is aware of installation D1 which it has confirmed as a useable installation. The probation object then monitors all seat identifiers 44 received by the server application 50 to determine which installations, having seat identifiers included in the set, are useable or active installations. For example, seat 3 may report or communicate with the server application 50 in which event the server application 50 then knows that it is a useable or active installation. Upon receipt of the communication from seat 3, its seat identifier is modified from "C1" to "C2" (see FIG. 15). At this point, the server application 50 is aware that two useable installations of the software application exists namely, the installation with unique seat identifier "D1" and the installation with unique seat identifier "C2". Under these example circumstances, as the license agreement only permits three useable applications at any given time, at least one of seats 1 and 2 must no longer be useable.

As shown in FIG. 16, a further handshake or communication may be received from a user computer 22-34 which has an installation of the software program 42 corresponding to seat identifier "C3" and, in response thereto, the application server 50 may once again update the seat identifier from "C2" to "C3". Likewise, if the user computer 22-34 on which a useable installation exists with a unique seat identifier "D1" reports to the server application 50, its unique seat identifier would be updated from "D1" to "D2" (see FIG. 17). Under these circumstances, the probation object remains the same and continues to monitor whether or not installations with seat identifiers "A2" and "B2" are useable installations.

Assuming then that seat 2 with a seat identifier "B2" reports or communicates with the application server 50, the server application 50 now knows that since the inception of the probation object (identifier monitoring), confirmation has been received from seats 2, 3 and 4 and, accordingly, all permissible seats for the given license have been confirmed. Accordingly, if installation or seat 1 with unique seat identifier "A2" is still useable such use is in violation of the license agreement. It will be appreciated, that the seat 1 may however have been uninstalled or discarded in some other way in which event no license violation exists. However, the probation object continues to monitor if a communication is received from seat 1 with its seat identifier A2 and, if so, the server application 50 may then confirm that, at the time the probation object was created, a license violation occurred. In these circumstances, an exception may be generated. The exception may be in the form of a message, an email or the like advising a licensee or a licensor of the license violation. In an embodiment, the exception may provide the licensee with an option to purchase one or more further seats or installations.

In an embodiment, the software program 42 need not be tied to the particular user computer 22-34 (or any computer environment), to the hard drive identifier, its location on the disk, registry settings, checksums or the like. As the seat identifier is used to monitor installation and use, the software program 42 may be provided on a portable hard drive as it may be independent of a changes in a hardware footprint that may trigger reactivation which may eventually require talking to customer service facility. Installing on a new computer, or reinstalling on the same computer may occur an unlimited number of times provided a previous installation is no longer used (and thus no reporting takes place). In a K-seat volume license the method 90 may detect (with some delay) when more than K seats have been in use. In one example embodiment, a volume license can be deployed with a dedicated server behind a company firewall. Accordingly, no client-server handshakes need to cross the company firewall. Furthermore, the company may keep track of the installed seats. It will however be appreciated that this is just one example of an installation and the invention is not limited to a server deployed where the user computers are. In an embodiment, an installation CD can be sent directly to customers (optionally without any encryption), the software program can be freely copied over the Internet, and or it can be pre-installed on new computers. Upon installation of the software program 42, the seat identifier 44 may then be used to monitor installation and/or use of the software program 42. In one example embodiment, utilizing the seat identifier 44 communication with the licensing server need not be secure. In an embodiment, there may be multiple probation objects, each monitoring different subsets of the seats with different seat limits. For example, if a new installation is received, a second probation object may be created monitoring whether any three of seats (A2,B3,C3,D2) will prove to have been active. In an embodiment, the seat identifiers shown in FIGS. 10-17 may correspond to those provided at a client application 40. It will be appreciated that corresponding seat identifiers may be provided at a server application 50.

In one example embodiment, using the method 90, there may be no need to explicitly manage or deactivate seats that are no longer in use. For example, when a seat no is no longer in use, it may simply not send a report and the probation object may then remain dormant. For example, in FIG. 18 if seat 1 with seat identifier "A2" never send a report to the licensing server 36, the object may never trigger an exception.

In an embodiment, a licensee may purchase a retail copy of the software program 42 subject to a shrink-wrap license and later extend it to a volume-license. The licensing server 36 in these circumstances may then increment the seat limit associated with the license (see column 146 in FIG. 8). A single-license shrink-wrap version can simply be represented as a volume-license of a single seat.

It will be appreciated that, in an example embodiment, the probation objection (seat identifier monitoring) monitors if a seat is currently in use or will ever be in use in the future, and such a seat may then be considered active. This scenario may differ from licensing models where 'active' may be interpreted as in use at a particular moment in time.

A further scenario in which seat identifiers 44 may be used to monitor installation and use of a software program 42 is set out below. Assume that a customer purchases a 3-seat volume license of software program such as Photoshop available from Adobe. He installs it on a user computer named Betty. The installation contacts the licensing server 36 and gets assigned the seat identifier of 1. The customer then installs it on another user computer, Fred and that seat gets an identifier of 2. Then Betty gets a computer virus and Photoshop needs to be reinstalled on it that seat gets an identifier of 3. Photoshop is then installed on a third computer Wilma, and that seat is tagged with an identifier of 4. When installing on Wilma the customer may be reminded that the number of installations exceeds the number of purchased seats. The licensing server 36 may know how many of the four seats are active and create a probation object to watch whether it will ever get a handshake from each of the four seats (with identifiers 1, 2, 3, and 4). As Photoshop has been reinstalled on Betty's computer, we know that this will never happen and that seat 1 is now (and will always be) inactive as the first installation is lost.

After several months of using Photoshop from Betty, Fred and Wilma, the user may install it on Barney (with an identifier of 5). The user may then again be advised that the number of installations exceeds the number of seats. The licensing server 36 may now add a second probation object observing all seats observing seats 1,2,3 and 4 and checking whether any three of them will be proven to be active (we assume, by way of example, that 5 is active since it is has just been installed). Soon all four machines, Fred (2), Betty (3), Wilma (4), and Barney (5) may handshake with the server. At this point the licensing server 36 knows that Photoshop was installed on Barney in violation of the license agreement and may communicate this to the customer requesting that more seats be purchased.

Various example embodiments of the method and system are set out below.

Fixed and Variable Seat Identifiers

It will be appreciated fixed or variable seat identifiers may be assigned to an installation or seat. Both the server and the seat may keep track of a current unique identifier, and the server may make sure the seat identifier provided by the seat during a report or handshake matches the one that it has stored at the licensing server 36. The seat identifier may thus become a one-time-password that is changed after each report or handshake. In an embodiment, the sequence of unique seat identifiers that the server may generate need not be complicated or difficult to guess. Examples of seat identifiers include a handshake time stamp, or a total number of handshakes (e.g., a sequence of natural numbers as described above). This may provide some form of tamper resistance and the communication with the licensing server need not be encrypted and the mechanism need not be kept secret.

Floating Seat Identifiers

In an embodiment, a seat identifier (optionally together with its registration number) may represent the right for the given seat to be operational. The current seat identifier 44 can be stored on a hard drive of the user computer 22-34 on which the seat is installed. However, in addition or instead, the seat identifier 44 may be stored on portable media, such as a disk, a USB memory stick, a handheld computer, or the like. In these circumstances, the portable media may then provide a user's right to use the software program 42 from any installation, for example, a copy from a library, an otherwise inactive copy, a friend's computer or the like. This may also allow the user to unlock certain purchased features in the software program which would not be available with a different seat identifier. In an embodiment, a floating seat identifier may be variable or fixed. A variable floating seat identifier may not be kept secret.

Server Validation

As described above, in an embodiment a random number encrypted with the licensor's server's public key may be provided (see FIG. 9) and expect in return the decrypted random number.

Pay-Per-Time, Pay-Per-Feature, Try-and-Buy, and Try-and-Die

In one example embodiment, the report or handshake may be used to exchange various other information related to the user's account, such as the set of purchased features, the set of features used for evaluation purposes, the time until the software subscription expires, whether extension would be allowed, the current account balance, the number of reinstalls, how many seats are still available, or the like. For example, functionality my be provided limits or restricts use of an installation to a specified or selected time period. Thus, in an embodiment, a Try-and-Buy feature and/or a Try-and-Die feature may be provided. In an embodiment including a Try-and Buy feature, the software program or installation may be active or useable for a trial period during which a user may evaluate or make a decision as to whether or not to purchase the software program. In these circumstances a licensing server may identify the software installation as an unauthorized installation after the trial period has lapsed and, optionally, monitor receipt of any handshake from the particular installation after the trial period has lapsed. It will be appreciated that the licensing server may then take any selected or predefined action (e.g., advise the user of the unauthorized use, provide a user with an opportunity to purchase further licenses, inform a support facility, or the like). Likewise, the Try-and-Die feature may be configured so that the software application is disabled or rendered inoperable after a trial period has lapsed. In an embodiment including Pay-per-Feature functionality, the capabilities or features (e.g., advanced capabilities or functionality) of the software program may be enabled or disabled based on privileges associated with a license identifier. For example, a record of privileges associated with a particular license may be kept at a licensing server and, when a user is authorized to use more features of the software program, the software program may be enabled accordingly. For example, an appropriate installation identifier recognized by the software application as authorizing one or more features may be communicated to the client computer. It will be appreciated that the added functionality (e.g., upgrading from a standard to a professional version) may thus be identified by a new installation identifier communicated from the licensing server during a handshake to the client computer. In an embodiment, a user may be entitled or authorized to use the software program for a fixed period of time which may be monitored using the handshake functionality. Thus, the periodic communications between a client computer and a licensing server may allow added functionality associated with a software license that regulates use of a software program. Thus, in an embodiment, the system 20 may include one or more of the following features: Try-and-Buy wherein the installation identifier is used to limit a duration for which the software program is useable at no cost; Try-and Die wherein the installation identifier is used to terminate operation of the software program after a trial period; Pay-per-Time wherein use of the software program is based on a time for which use has been purchased; and Pay-per-feature wherein the installation identifier is used to control enabling of selected features of the software program.

No Internet Connection

It will be appreciated that the Internet may be a convenient, but not the only way to accomplish a handshake with the licensing server 36. The report from the client application 40 and the server application's response may be represented as numbers that can be exchanged in any form of communication. As described above, the report can be via telephone, fax, or the like. For example, the software program 42 upon installation may request a user to call a 1-800 number and dial in the request. The automated service may then inform the user the required reply (seat identifier) to type back to the application. When using a variable seat identifier, the request and could be different numbers with each handshake. In an example embodiment, the numbers need not be hidden and may not be reused.

As mentioned above, when a protected software program is installed on a user computer that has no access to the Internet, alternative methods (e.g., phone or fax) may be used for successful handshakes. A non-Internet seat may require only a single handshake with the licensing server 36. When the licensing server 36 receives a handshake from a non-Internet seat, it may simply decrement the number of purchased seats, and also assign it a seat identifier. Another server handshake may be needed when the non-Internet copy is uninstalled, to claim back its seat. If a hard-drive is corrupted and the seat cannot be uninstalled, the seat may be reclaimed via customer service.

Postponed Handshakes/Reports

In an embodiments, instead of attempting to connect to a licensing server 36 directly, client applications 40 may queue outgoing handshake information in a file. Handshakes may be delegated to a separate process that may replace the outgoing with the incoming information after the handshake. That process could be run separately (e.g., constantly, or every time the user connects to the Internet). Accordingly, handshakes may be successful even for computers that rarely connect to the Internet, even if the protected software program 42 is never run while Internet is available. In an embodiment with postponed handshakes, a current timestamp is also stored when the handshake was queued. Suppose, for example, that the user installs a legal copy of the software program on one machine, (exceeding a seat limit), and no longer runs the copy from another PC, the other PC may have older handshakes in the queue. When communicating the queue to the licensing server 36, the licensing server 36 may incorrectly determine that the seat is active. When the timestamps of every installation is known, if handshakes are attempted only while the software program is running, and if unsuccessful, they may be queued with the current timestamp, and the licensing server 36 may be able to determine that the queued handshakes happened before the new installation and they may thus be ignored.

In-House Server

Large corporations, or companies that have a policy against handshakes across the firewall, may install their own licensing server behind the firewall. Whether a remote server or an in-house server is used can be an option during installation (or simply encoded in the license number), or it could be made configurable on an already installed seat. The switch from a remote or central server to an in-house licensing server may be configurable from the central licensing server.

Shrink-Wrap to Volume License

In one example embodiment, a company may purchase more seats as its needs grow. Since a shrink-wrap (or single-user) license may represented as a volume license of a single seat, it can be converted to a volume license.

Figure 19:
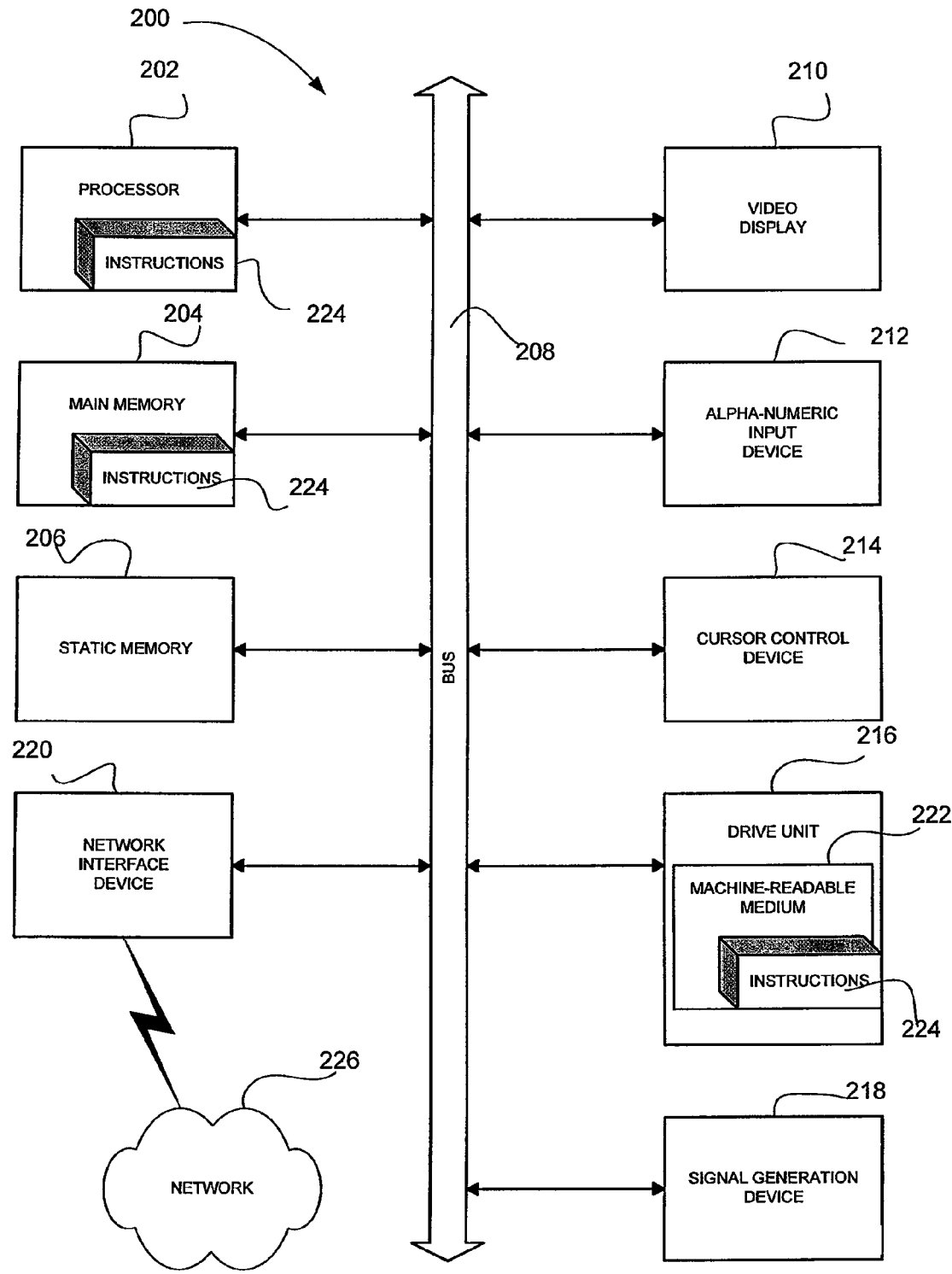
FIG. 19 shows a diagrammatic representation of a machine in the example form of a computer system for performing any one or more of the methodologies discussed herein.

FIG. 19 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to comprise any collection of machines that individually or jointly execute a set (or multiple sets) of instructions to perform any one or more of the methodologies discussed herein.

The example computer system 200 comprises a processor 202 (e.g., a central processing unit (CPU) a graphics processing unit (GPU) or both), a main memory 204 and a static memory 206, which communicate with each other via a bus 208. The computer system 200 may further comprise a video display unit 210 (e.g., a liquid crystal display (LCD) or a cathode ray tube (CRT)). The computer system 200 also comprises an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 comprises a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an example embodiment to be a single medium, the term "machine-readable medium" should be taken to comprise a single medium or multiple media (e.g., a centralized or distributed database, and/or associated caches and servers) that store the one or more sets of instructions. The term "machine-readable medium" shall also be taken to comprise any medium that is capable of storing, encoding or carrying a set of instructions for execution by the machine and that cause the machine to perform any one or more of the methodologies of the present invention. The term "machine-readable medium" shall accordingly be taken to comprise, but not be limited to, solid-state memories, optical and magnetic media, and carrier wave signals.

Thus, a method and system to monitor installation of a software program on at least one user computer have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of monitoring installation of a software program on at least one user computer, the method comprising:
   receiving an installation identifier identifying a useable installation of the software program on the at least one user computer;
   creating a list of monitored installation identifiers when a number of user installations exceeds a limit of useable installations, the list of monitored installation identifiers containing all received installation identifiers;
   determining if the installation identifier is on the list of monitored installation identifiers; and
   when the installation identifier is on the list of monitored installation identifiers, modifying the list so that the installation identifier is no longer a monitored installation identifier.

2. The method of claim 1, in which the installation identifier is associated with a software license, the software license defining the limit as a number of permitted useable installations of the software program.

3. The method of claim 2, which comprises:
   identifying a number of permitted useable installations in each list; and
   decrementing the number of permitted useable installations each time the list is modified.

4. The method of claim 3, which comprises generating an exception when the number of permitted useable installations is zero.

5. The method of claim 1, in which modifying the list comprises removing the installation identifier from the list or marking the installation identifier as being no longer a monitored installation identifier.

6. The method of claim 1, which comprises creating a monitoring instance each time a number of useable installations exceeds the limit of useable installations.

7. The method of claim 6, in which determining when the number of useable installations exceeds the limit of useable installations defines a beginning of a monitoring period.

8. The method of claim 1, which includes at least one of the features selected from the group consisting of:
   Try-and-Buy wherein the installation identifier is used to limit a duration for which the software program is useable at no cost;
   Try-and Die wherein the installation identifier is used to terminate operation of the software program after a trial period;
   Pay-per-Time wherein use of the software program is based on a time for which use has been purchased; and
   Pay-per-feature wherein the installation identifier is used to control enabling of selected features of the software program.

9. The method of claim 1, which comprises receiving at a server the installation identifiers via a communication network.

10. The method of claim 9, wherein the at least one user computer periodically communicates the installation identifier to the server when a useable installation of the software program is on the at least one computer.

11. The method of claim 10, wherein the software program comprises an installation identification module that periodically communicates its installation identification to the server.

12. The method of claim 1, which comprises:
    creating a unique installation identifier uniquely associated with initialization of the software program; and
    communicating the unique installation identifier and initialization data to the user computer to initialize the installation and to identify the installation when receiving the identifier from the at least one user computer.

13. The method of claim 1, which comprises:
    updating the received installation identifier;
    storing the updated installation identifier as a current reference installation identifier; and
    communicating the updated installation identifier to the at least one user computer so for the user computer to send it as the installation identifier in a subsequent communication from the user computer.

14. The method of claim 13, which comprises updating the installation identifier associated with the installation in the list of monitored installation identifiers.

15. The method of claim 13, in which the updated installation identifier is unique for each communication with each user computer.

16. The method of claim 13, which comprises generating an exception when the installation identifier subsequently received does not correspond to the reference installation identifier, the exception indicating a potential license violation.

17. The method of claim 1, which comprises receiving a plurality of installation identifiers periodically from a plurality of user computers.

18. The method of claim 1, which comprises:
receiving a random number generated at the user computer using a public key;
decrypting the encrypted random number at a server to obtain a decrypted random number; and
communicating the decrypted random number to the user computer, the user computer generating an exception when the decrypted random number does not correspond with the random number generated at the user computer.

19. A computer storage medium storing instructions which, when executed by a machine, cause the machine to perform the method of claim 1.

20. A system to monitor installation of a software program on at least one user computer, the system comprising:
a processor-implemented communication module to receive an installation identifier identifying a useable installation of the software program on the at least one user computer;
a processor-implemented processing module to create a list of monitored installation identifiers when a number of user installations exceeds a limit of useable installations, the list of monitored installation identifiers containing all received installation identifiers, and determine if the installation identifier is on the list of monitored installation identifiers; and wherein when the installation identifier is on the list of monitored installation identifiers, modifying the list so that the installation identifier is no longer a monitored installation identifier;
a processor to implement the communication module and the processing module; and
a memory to store the communication module and the processing module.

21. A system to monitor installation of a software program on at least one user computer, the system comprising:
means for receiving an installation identifier identifying a useable installation of the software program on the at least one user computer; and
means for creating a list of monitored installation identifiers when a number of user installations exceeds a limit of useable installations, the list of monitored installation identifiers containing all received installation identifiers, and determining if the installation identifier is on the list of monitored installation identifiers, and wherein when the installation identifier is on the list of monitored installation identifiers, modifying the list so that the installation identifier is no longer a monitored installation identifier.

\* \* \* \* \*